United States Patent
Abe et al.

(10) Patent No.: US 8,939,504 B2
(45) Date of Patent: Jan. 27, 2015

(54) SEAT BACK OF VEHICLE SEAT

(71) Applicants: Hiroshi Abe, Tokyo (JP); Masato Miyaguchi, Tokyo (JP)

(72) Inventors: Hiroshi Abe, Tokyo (JP); Masato Miyaguchi, Tokyo (JP)

(73) Assignee: Tachi-S Co., Ltd. (JP)

( * ) Notice: Subject to any disclaimer, the term of this patent is extended or adjusted under 35 U.S.C. 154(b) by 0 days.

(21) Appl. No.: 14/172,652

(22) Filed: Feb. 4, 2014

(65) Prior Publication Data

US 2014/0265494 A1 Sep. 18, 2014

(30) Foreign Application Priority Data

Mar. 12, 2013 (JP) .................. 2013-048558

(51) Int. Cl.
*B60N 2/42* (2006.01)
*B60N 2/64* (2006.01)

(52) U.S. Cl.
CPC ........................................ *B60N 2/64* (2013.01)
USPC .................................................... 297/216.13

(58) Field of Classification Search
USPC ........................................ 297/216.13, 216.14
See application file for complete search history.

(56) References Cited

U.S. PATENT DOCUMENTS

| | | | |
|---|---|---|---|
| 7,234,769 B2* | 6/2007 | Takenaka et al. | 297/216.12 |
| 7,325,869 B2* | 2/2008 | Braune | 297/216.12 |
| 7,644,987 B2* | 1/2010 | Humer et al. | 297/216.12 |
| 7,677,659 B2* | 3/2010 | Humer et al. | 297/216.14 |
| 8,061,774 B2* | 11/2011 | Omori et al. | 297/284.4 |
| 8,113,578 B2* | 2/2012 | Furuta et al. | 297/216.13 |
| 8,215,709 B2* | 7/2012 | Humer et al. | 297/216.12 |
| 8,696,061 B2* | 4/2014 | Kasama et al. | 297/216.14 |
| 2013/0169010 A1* | 7/2013 | Sugiyama et al. | 297/216.13 |

FOREIGN PATENT DOCUMENTS

JP 2006-341802 12/2006

* cited by examiner

*Primary Examiner* — Milton Nelson, Jr.

(74) *Attorney, Agent, or Firm* — Ostrolenk Faber LLP (57) ABSTRACT

A seat back of vehicle seat including: a seat back frame; a support wire element disposed in the seat back frame; a support plate attached to the support wire element such that an upper portion thereof projects upwardly from the support wire element; and a resilient reinforcing element provided to that upper portion of support wire element, thereby normally reinforcing such upper portion. The resilient reinforcing element has two upper end portions respectively slidably engaged with two brackets of the seat back frame and a main reinforcing portion which is resiliently extensible, while being resiliently deformable rearwardly of the seat back frame. Another resilient reinforcing element having a pair of reinforcing portions may be provided to a lower portion of the support wire element to normally reinforce such upper portion. Each of those two different reinforcing elements is resiliently deformable rearwardly by an excessive great load applied thereto.

15 Claims, 6 Drawing Sheets

SEAT BACK OF VEHICLE SEAT

BACKGROUND OF THE INVENTION

1. Field of the Invention

The present invention relates to a seat back of vehicle seat or automotive seat. In particular, the invention is directed to a seat back of the type workable to prevent or minimize forward and rearward swinging or rocking of a seat occupant's upper body portion under a normal condition where a rearward low load is repeatedly applied from the seat occupant to the seat back, and also absorb an excessive great rearward load applied from the seat occupant to the seat back in the event of rear-end collision or the like to thereby protect the seat occupant against damage and injury.

2. Description of Prior Art

Among the seat backs of the above-stated kind, there is known a seat back with an active headrest arrangement, which is so designed that, when a rear-end collision occurs, a support element in the seat back receives a back portion of seat occupant being displaced rearwardly thereto under his or her inertia and is then displaced rearwardly to absorb a great impact given to the seat occupant's back portion, while simultaneously a headrest is moved forwardly to receive a head of the seat occupant via an active headrest mechanism. Such seat back is for example disclosed in Japanese Laid-Open Publication No. 2006-341802 (JP 2006-341802 A).

According to the foregoing JP 2006-341802 A, a seat back structure is disclosed, which includes: a seat back frame of substantially rectangular shape having a spaced defined inwardly thereof; a support wire element resiliently supported within such space of the seat back frame in a suspended manner; and a support plate provided anteriorly of the support wire element. A foam padding is disposed anteriorly of and laid on that support plate within the seat back. Basically, with such structure, the back portion of a seat occupant is resiliently supported by the support wire element via the foam padding.

The support wire element is at the upper region thereof connected via a pair of coil springs to a pair of side frame members of the seat back frame, respectively, while being at the lower region thereof connected via a pair of linear spring wires to those two side frame members, respectively. Hence, normally, the upper portion (dorsal portion) of seat occupant is resiliently supported by the two coil springs, whereas the lower portion (lumbar portion) thereof resiliently supported by the two spring wires. Such spring arrangement works effectively in the case of rear-end collision. Upon occurrence of rear-end collision, an excessive great load is applied from a seat occupant's back portion, under inertia of the seat occupant, to both coil springs and spring wires which in turn provide and increase a counter repulsive force against the excessive great load, while being resiliently extended in the rearward direction, so that most of a corresponding great impact to the dorsal and lumbar portions of seat occupant is reduced.

Further, the JP 2006-341802 A teaches a rear-end-collision active linkage provided between a lower area of the support wire element and a headrest movably provided on the top of the seat back, with such an arrangement that, upon occurrence of rear-end collision, the lumbar portion of seat occupant is moved rearwardly to impart a rearward great load through the foam padding and support wire element to a cross portion of the linkage, and at that moment, the linkage is immediately articulated so as to cause concurrent forward movement of the headrest to receive and support a head of the seat occupant.

However, the above-described conventional seat back has been with the problem that, excepting the rear-end collision, for example, during running of vehicle on an uneven road and/or when the vehicle is normally stopped several times on a normal road, both dorsal and lumbar portions of seat occupant are easily swung and rocked on the seat back forwardly and rearwardly, which makes it impossible to keep the seat occupant in a stable and comfortable condition. This unstable seating condition is due to the following facts: i) The aforesaid two coil springs, owing to its coil configuration, will be easily extended proportionally responsive to an increased load applied thereto (i.e. responsive to any of low and great loads applied thereto), and therefore, each of the coil springs, upon its receiving a low load several times, is quickly extended and contracted many times, thus causing the seat occupant's dorsal portion to swing and rock in the forward and rearward directions at the upper area of the seat back, and ii) also, each of the afore-said two spring wires, owing to its simple rectilinear configuration, will be easily warped resiliently responsive to a low load applied thereto, as a result of which, such rectilinear spring wire, upon its receiving a low load several times, is immediately extended and contracted numerous times, thus causing the seat occupant's lumbar portion to swing and rock repeatedly in the forward and rearward directions at the lower area of the seat back.

It has been, therefore, desired to provide a seat back of this kind which can prevent or minimize the aforementioned forward-and-rearward swinging or rocking of the seat occupant's dorsal and lumbar portions under a normal condition where a low load is applied to the seat back, and also can absorb the excessive great load caused in the case of rear-end collision or the like.

SUMMARY OF THE INVENTION

In view of the afore-stated drawbacks, it is a first purpose of the present invention to provide a seat back of vehicle seat which makes it possible to prevent or minimize forward-and-rearward swinging or rocking of an upper body portion of a seat occupant under a normal condition where a low load is repeatedly applied from the seat occupant to the seat back, so that the seat occupant can feel and enjoy a stable, conformable support at his or her back portion, while effectively absorbing an excessive great load caused at the seat occupant's upper body portion in the case of a rear-end collision or the like to prevent a corresponding great impact from being imparted to the seat occupant.

In order to achieve such purpose, a seat back of vehicle seat in accordance with the present invention is basically comprised of:

a frontal surface facing to a forward side of the seat back, the frontal surface being adapted to receive a back portion of a seat occupant to be seated in the vehicle seat;

a foam padding provided in the seat back, the foam padding including a padding portion disposed adjacent to the frontal surface of the seat back;

a seat back frame so formed to have a space defined inwardly thereof, the seat back frame including: a first bracket having a hole formed therein; and a second bracket having a hole formed therein, wherein the first and second brackets are disposed in a spaced-apart and opposedly-facing relationship;

a support wire element having a rigidity, the support wire element being disposed within the space of the seat back frame in a suspended manner;

a support plate disposed anteriorly of the support wire element within the space of the seat back frame, the support plate being attached to the support wire element and adapted to support the padding portion of the foam padding;

the support wire element including an upper portion which projects from the support wire element in a direction upwardly of the seat back frame; and a resilient reinforcing element formed of a rigid wire having an elastic property, the resilient reinforcing element being provided to the upper portion of the support wire element and being so configured as to include:

a) a pair of upper end portions slidably inserted in the hole of the first bracket and the hole of the second bracket, respectively; and b) a main reinforcing portion which is resiliently extensible, while being resiliently deformable in a rearward direction of the seat back frame, wherein the resilient reinforcing element is of such a property that, under a normal condition where a low load is applied via the padding portion and support plate towards the upper portion of the support wire element in a rearward direction of the seat back, the resilient reinforcing element withstands the low load and maintains the shape thereof, thereby preventing the upper portion of the support wire element against movement in forward and rearward directions of the seat back, whereas on the other hand, upon an excessive great load being applied to that upper portion of support wire element in the rearward direction of the seat back, the resilient reinforcing element is resiliently deformed in the rearward direction, such that the main reinforcing portion thereof is resiliently extended, while being resiliently deformed in the rearward direction of the seat back frame, whereas at the same time, the pair of upper end portions thereof are slidingly moved in the hole of the first bracket and the hole of the second bracket, respectively, in a downward direction of the seat back frame, thereby absorbing the excessive great load.

With regard to the foregoing first aspect of the invention, the main reinforcing portion may include a plurality of vertical and horizontal regions defined therein. Those vertical and horizontal regions be connected with the support wire element, so that the upper portion of the support wire element is reinforced thereby to withstand the low load under the normal condition. Also, the resilient reinforcing element may be formed by bending one rigid wire having an elasticity in such a configuration that the main reinforcing portion thereof includes the plurality of vertical and horizontal regions defined therein and extends in a sinuous fashion in a direction transversely of the seat back frame.

As a second aspect of the invention, the support wire element may be so formed to include: a first vertical portion having an upper portion corresponding to the upper portion of the support wire element; a second vertical portion having an upper portion corresponding to the upper portion of the support wire element; a lower portion defined blow the upper portion of the support wire element, such lower portion including: a first connecting portion defined in the first vertical portion at a point below the upper portion of the support wire element; and a second connecting portion defined in the second vertical portion at a point below the upper portion of the support wire element, wherein the first and second connecting portions are situated below the first and second brackets, respectively. Further, the seat back may include another resilient reinforcing element which is provided to the lower portion of the support wire element and formed of a rigid wire having an elastic property, wherein such another resilient reinforcing element is so configured as to include: a body portion; and a pair of reinforcing portions extending outwardly from the body portion in a direction opposite to each other, such pair of reinforcing portions being securely connected with the first and second connecting portions of the support wire element, respectively. This another resilient reinforcing element is resiliently extensible, while being resiliently deformable in the rearward direction of the seat back frame. The thus-formed another resilient reinforcing element is of such a property that, under a normal condition where a low load is applied via the padding portion and support plate towards the lower portion of the support wire element in the rearward direction of the seat back, the resilient reinforcing element per se withstands the low load and maintains the shape thereof, thereby preventing the lower portion of the support wire element against movement in forward and rearward directions of the seat back frame, whereas on the other hand, upon an excessive great load being applied to the lower portion of the support wire element in the rearward direction of the seat back, the resilient reinforcing element per se is resiliently deformed in the rearward direction, such that the pair of reinforcing portions thereof are each resiliently extended, while being resiliently deformed in the rearward direction of the seat back frame, thereby absorbing the excessive great load.

As a third aspect of the invention, the support wire element may be formed by bending one rigid wire in a substantially "U" shape including the first and second vertical portions defined therein, such that the first vertical portion has an upper end portion corresponding to the upper portion of the support wire element, whereas the second vertical portion has an upper end portion corresponding to the upper portion of the support wire element. Further, such support wire element may include: a first outwardly-curved connecting portion corresponding to the first connecting portion; and a second outwardly-curved connecting portion corresponding to the second connecting portion, in such a manner that the first and second outwardly-curved connecting portions protrude outwardly of the first and second vertical portions, respectively, in a direction opposite to each other. In this mode, the body portion of the afore-said another resilient reinforcing element is securely connected with the first and second outwardly-curved connecting portions of the support wire element, such that the pair of reinforcing portions of that particular another resilient reinforcing element project outwardly of the support wire element in a direction opposite to each other and are connected with the seat back frame.

Other various features and advantages will become apparent from reading of the description, hereinafter, with reference to the accompanied drawings.

DETAILED DESCRIPTION OF PREFERRED EMBODIMENT OF THE INVENTION

Figure 1:
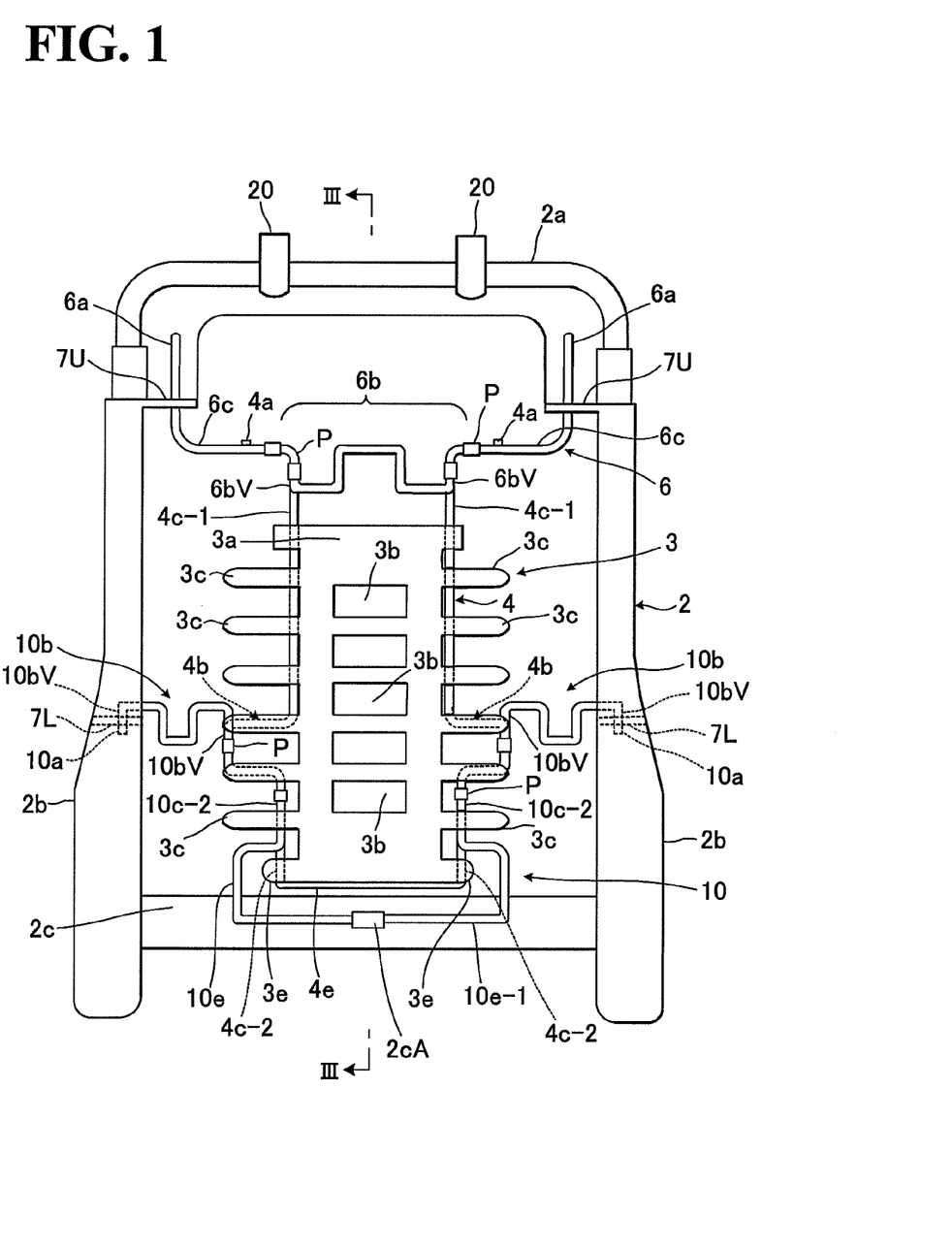
FIG. 1 is a front view of a seat back frame including upper and lower resilient reinforcing elements provided therein, as one of principal parts of the present invention, the seat back frame being adapted to be provided in a seat back of vehicle seat.
Figure 2:
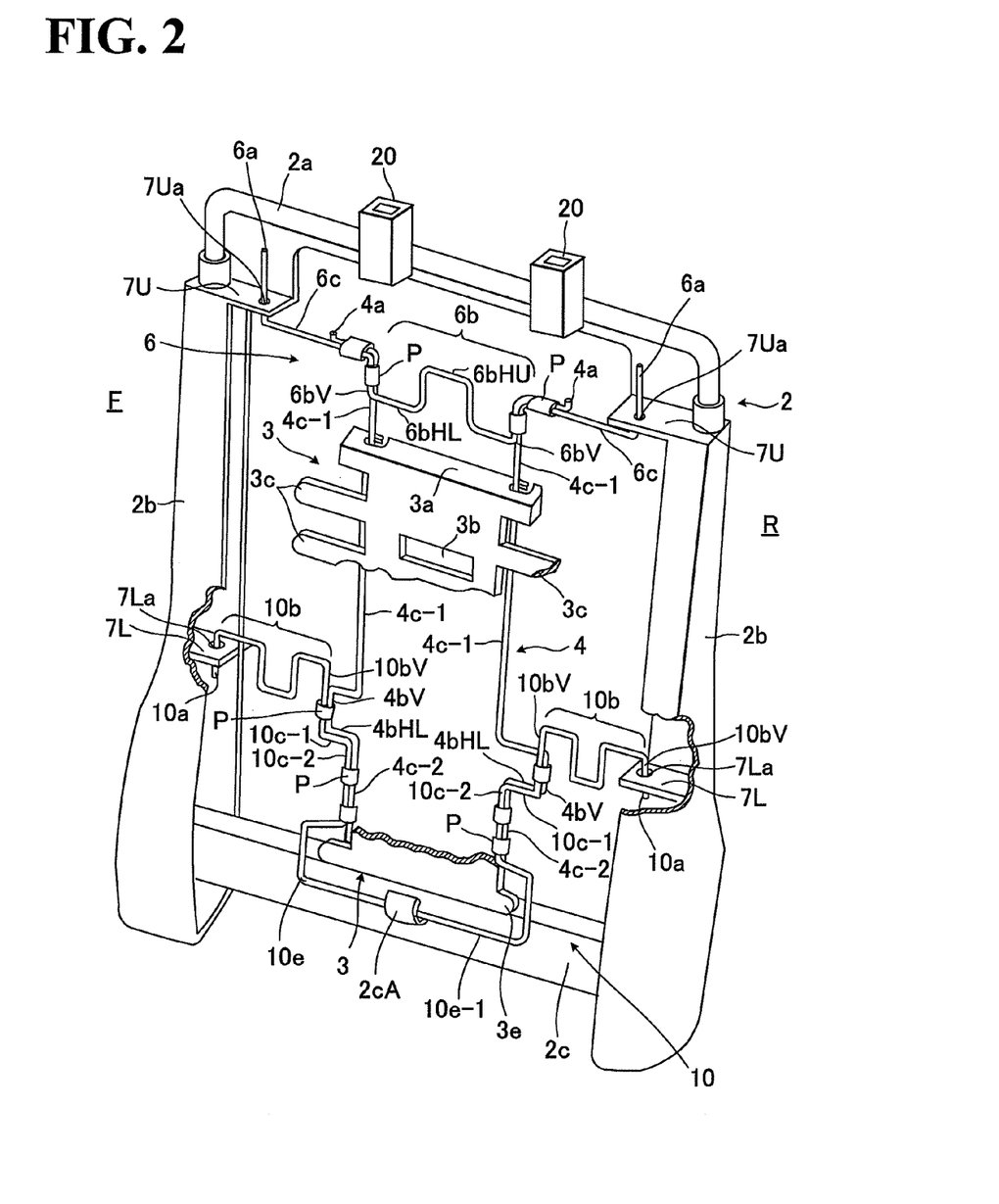
FIG. 2 is a partly broken perspective view of the seat back frame.
Figure 3:
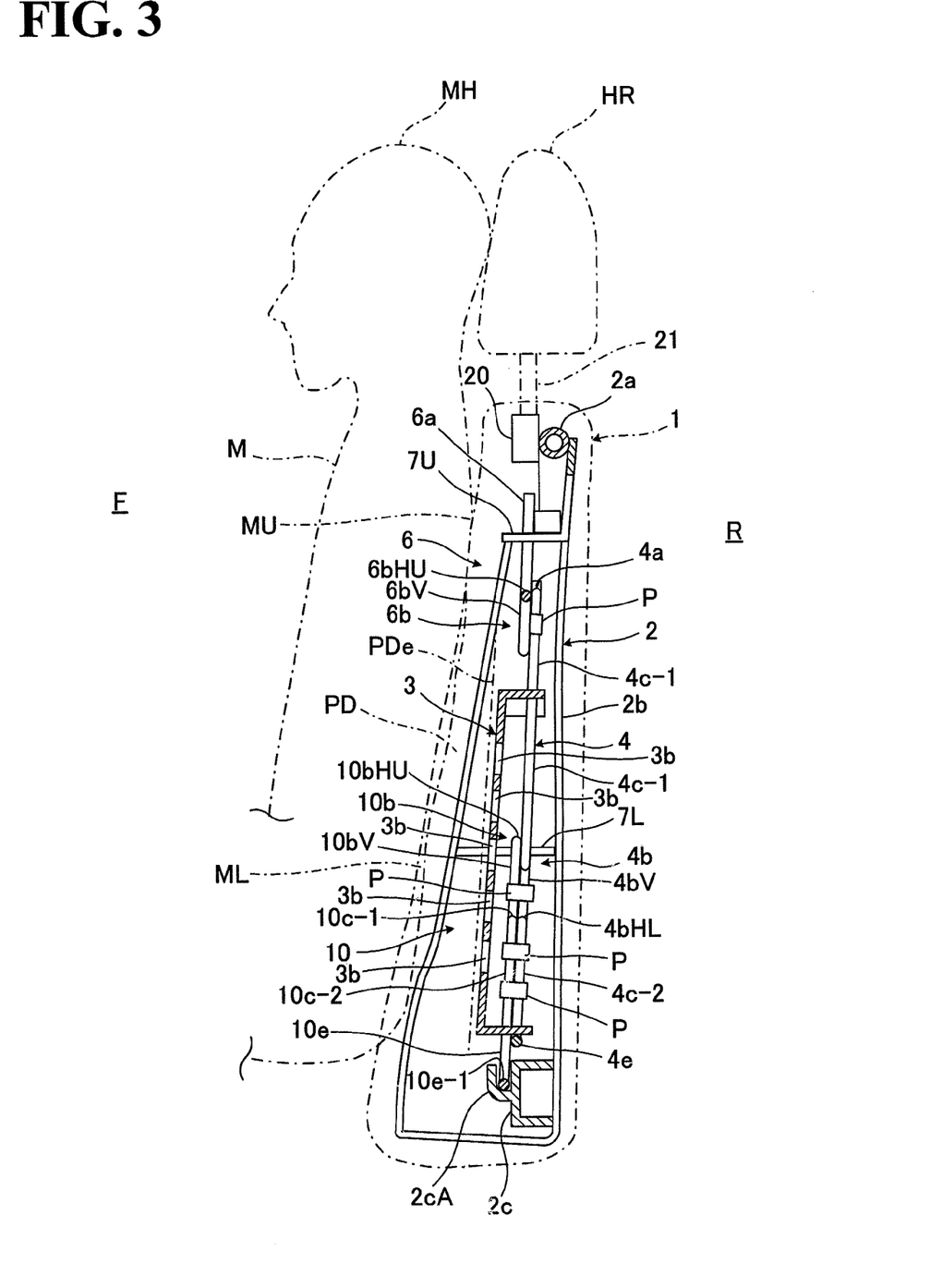
FIG. 3 is a schematic sectional view taken along the line III-III in the FIG. 1, which illustrates a state where a seat occupant's back portion is stably supported by the seat back under a normal condition.

Referring to FIGS. 1 to 9, there is illustrated one exemplary preferred mode of a seat back of a seat for use in a vehicle including an automobile, in accordance with the present invention, the seat back being generally designated by 1 (see FIG. 3).

FIGS. 1 and 2 illustrate a seat back frame 2 to be provided in the seat back 1, the seat back frame being of a substantially rectangular shape having a space defined therein, and also illustrate a principal part of the invention which is resiliently supported in that space of the seat back frame 2 in a suspended manner, wherein such principal part comprises: a support wire element 4; an upper resilient reinforcing element 6; and a lower resilient reinforcing element 10. In brief, according to the present invention, those two resilient reinforcing elements 6 and 10 function to normally reinforce the support wire element 4 for the purpose of preventing or minimizing the previously-stated swinging and rocking of a seat occupant under a normal condition, while allowing both two reinforcing elements 6 and 10 per se to be resiliently warped rearwardly upon an excessive great load applied thereto in the case of rear-end collision. The details thereof will be elaborated later.

In this respect, it is to be understood from FIG. 3 that the foregoing seat back frame and principal part are upholstered with a foam padding PD and a trim cover element (not shown) affixed on outer surfaces of the foam padding PD and other required padding portions (not shown), in a known fashion, thus forming a predetermined configuration of the seat back 1.

It is noted that the terms, "forward", "forwardly" and "frontal", refer to a forward side F of both seat back 1 and seat back frame 2, whereas the terms, "rearward" and "rearwardly", refer to a rearward side R of both seat back 1 and seat back frame 2.

As indicated in the FIG. 3, a headrest HR is securely provided on the top of the seat back 1. Although not clearly shown, it is to be understood that a pair of stays 21 of the headrest HR are securely supported in a pair of support brackets 20, respectively, wherein the pair of support brackets 20 are fixed to the upper frame member 2a of the seat back frame 2.

The seat back frame 2 is formed by the afore-said upper frame member 2a, a pair of side frame members 2b and 2b, and a lower frame member 2c, as is known. In the present invention, as best shown in FIG. 2, the seat back frame 2 includes a pair of upper brackets 7U and 7U which are respectively defined in the two upper regions respectively of the pair of side frame members 2b and 2b, and also includes a pair of lower brackets 7L and 7L respectively defined in two predetermined lower regions respectively of those two side frame members 2b and 2b, wherein such two predetermined lower regions are situated substantially at a location where a lumbar portion of a seat occupant is to be supported by the seat back, as will be explained later.

Figure 8:
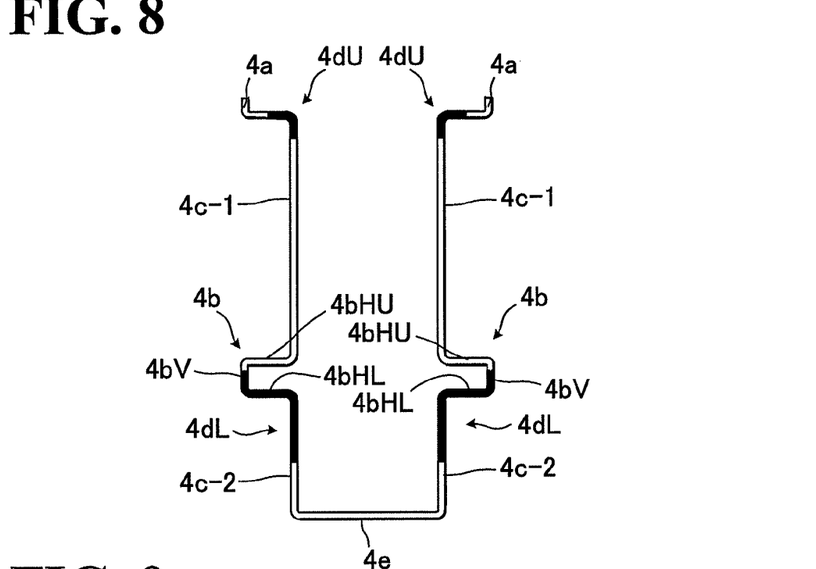
FIG. 8 is a front view of a support wire element.

The support wire element 4 is made of a rigid metallic material for example and adapted to support a frontal portion of the seat back 1 which includes a corresponding forward region of the foam padding PD. The support wire element 4 is also adapted to substantially support both dorsal and lumbar portions of a seat occupant, as understandable from FIG. 3. With reference to FIG. 8, the support wire element 4 is depicted to be formed by bending one rigid wire in a substantially "U" shape so as to define: a pair of first rectilinearly-extending vertical portions 4c-1 and 4c-1; a pair of second rectilinearly-extending vertical portions 4c-2 and 4c-2; a lower cross end portion 4e extended rectilinearly between those two second vertical portions 4c-2 and 4c-2; a pair of outwardly-curved or oxbow portions 4b and 4b; and a pair of outwardly horizontally extending end portions 4a and 4a.

As shown in FIG. 8, the left-side oxbow portion 4b is defined between the left-side first and second vertical portions 4c-1 and 4c-2, whereas the right-side oxbow portion 4b defined between the right-side first and second vertical portions 4c-1 and 4c-2, such that both two oxbow portions 4b and 4b lie at a same level and protrude outwardly in a direction opposite to each other relative to the support wire element 4. Those two oxbow portions 4b and 4b are adapted for connection with the lower reinforcing element 10, as will be described later.

On the other hand, as in FIG. 8, the left-side end portion 4a extends outwardly and continuously from the right-side first vertical portion 4c-1, whereas the right-side end portion 4a extends outwardly and continuously from the right-side first vertical portion 4c-1. Such two end portions 4a and 4a extend horizontally on a same line in a direction opposite to each other relative to the support wire element 4. Each of the two end portions 4a and 4a terminates in an upturned distal end, as shown.

Designation 3 denotes a known support plate of a synthetic resin material, which is formed in the illustrated shape having a plurality of holes 3b formed in the body portion thereof and a plurality of elongated fins 3c horizontally extending from the opposite sides thereof, with a view to providing the support plate per se with an increased resilient deformability and providing a resiliently embracing support to the foam padding PD and a back portion of a seat occupant, as known in the art. This support plate 3 is shown as being disposed anteriorly of the seat back frame 2 and support wire element 4, on the forward side F of the seat back. The support plate 3 has upper and lower end portions 3a and 3e which are securely attached to the first and second rectilinear portions 4c-1 and 4c-2 of the support wire element 4, respectively. As best seen in FIG. 3, the frontal surfaces of that support plate 3 receives a rearward surface PDe of the foam padding PD.

It is noted that the support wire element's upper regions, i.e. the two upper end portions 4a and uppermost areas of the two first rectilinear portions 4c-1, are longer than the upper region (at 3a) of the support plate 3, thus projecting upwards therefrom and being exposed as illustrated. Therefore, the support plate 3 does not interfere with such upper region of the support wire element 4.

Figure 7:
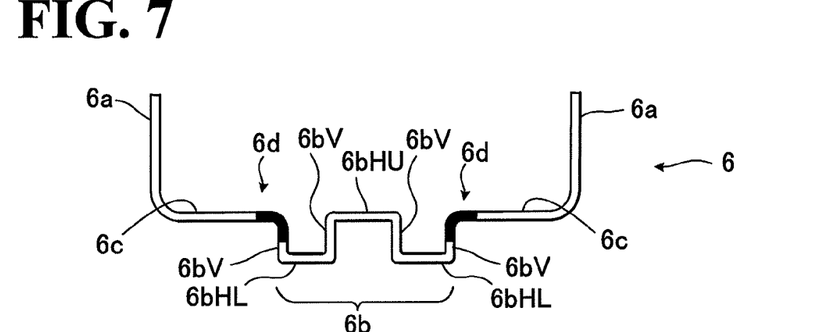
FIG. 7 is a front view of the upper resilient reinforcing element.

Reference being now made to FIG. 7, there is depicted the upper resilient reinforcing element 6 having the illustrated unique configuration which is formed by bending one wire only. Namely, the upper resilient reinforcing element 6 (hereinafter, upper reinforcing element 6) is formed by bending one wire having a certain elasticity, so as to define: a main reinforcing portion 6b of a zigzag or sinuous shape; a pair of rectilinearly-extending horizontal portions 6c and 6c which are situated on the opposite sides of the main reinforcing portion 6b and extends on a same horizontal line; and a pair of long end portions 6a and 6a extending vertically from the two horizontal portions 6c and 6c, respectively. The illustrated main reinforcing portion 6b is bent formed in a three-stroke wavy fashion. Specifically stated, the main reinforcing portion 6b includes four vertical regions 6bV disposed equidistantly abreast of one another along a horizontal direction transversely of the reinforcing element 6. Also, defined in that main reinforcing portion 6b are: a left-side lower horizontal region 6bHL; one upper horizontal region 6bHU; and a right-side lower horizontal region 6bHL, in such a manner that those three horizontal regions 6bHL, 6bHU and 6bHL are alternated with one another via the adjacent two of the four vertical regions 6bV, as shown in FIG. 7. Note that the upper horizontal region 6bHU lies in a coaxial alignment with both two horizontal portions 6c and 6c stated above.

Figure 9:
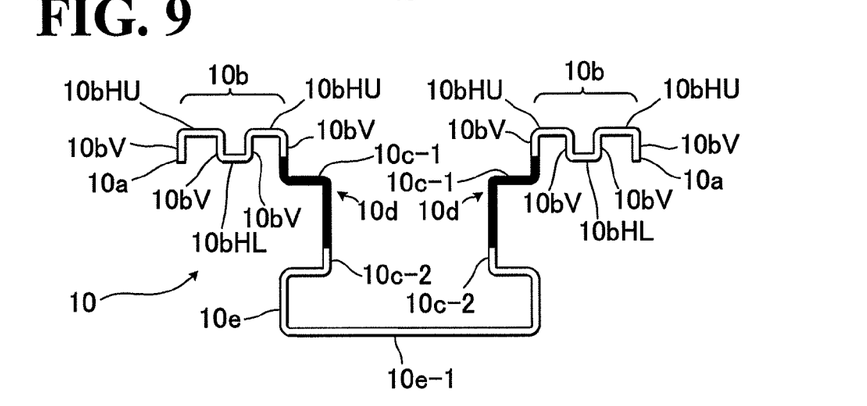
FIG. 9 is a front view of the lower resilient reinforcing element.

Reference being made to FIG. 9, the lower resilient reinforcing element 10 is depicted as having the illustrated unique configuration more intricate and different than the foregoing upper resilient reinforcing element 6.

This lower resilient reinforcing element 10 (hereinafter, lower reinforcing element 10) is also formed by bending one wire having a certain elasticity, so as to define: a pair of vertically-extending mid regions 10c-2 and 10c-2; a pair of left- and right-side reinforcing portions 10b and 10b which are defined above and symmetrically relative to the pair of vertically-extending mid regions 10c-2 and 10c-2; and a lower end portion 10e defined under those two mid regions 10c-2. Also, a pair of upper horizontal regions 10c-1 and 10c-1 are defined in the lower reinforcing element 10 so as to extend outwardly by a right angle respectively from the two upper ends respective of the two mid regions 10c-2 and 10c-2.

The left- and right-side reinforcing portions 10b and 10b are identical in shape and size to each other and disposed at upper region of the reinforcing element 10 so as to extend outwardly of the mid regions 10c-2 in a direction opposite to each other. As shown, each reinforcing portion 10b is formed in a zigzag or sinuous fashion to represent a three-stroke wavy configuration including four vertical regions 10bV and also including a left-side upper horizontal region 10bHU, one lower horizontal region 10bHL and a right-side upper horizontal region 10bHU, in this order. All the four vertical regions 10bV are disposed equidistantly abreast of one another along a horizontal direction transversely of the reinforcing element 10, whereas the three horizontal regions 10bHU, 10bHL and 10bHU are alternated with one another via the adjacent two of the four vertical regions 10bV.

Referring again to FIG. 9, in the left-side reinforcing portion 10b, a most right one of the vertical regions 10bV thereof, situated furthest to the right as viewed from the FIG. 9, extends downwardly longer than an outermost one thereof (situated furthest to the left) and is integral with free end of the left-side horizontal upper region 10c-1. On the other hand, in the right-side reinforcing portions 10b, a most left one of the vertical regions 10bV thereof, situated furthest to the left as viewed from the FIG. 9, extends downwardly longer than an outermost one thereof (situated furthest to the right) and is integral with free end of the right-side horizontal upper region 10c-1. Note that those two reinforcing portions 10b and 10b are disposed in alignment with each other upon a same horizontal line, as illustrated.

With regard to the lower end portion 10e, it is so formed to extend downwardly continuous from two lower ends respective of the two mid regions 10c-2 and 10c-2 and configured in a transversely-elongated loop shape, so to speak. Designation 10e-1 denotes a horizontal region of this lower end portion 10e, which is a connection point to be securely connected with the lower frame member 2c of the seat back frame 2, as will be set forth later.

In this context, it is noted that a distance between the two first vertical portions 4c-1 and 4c-1 of the support wire element 4 is equal to an entire length of the main reinforcing portion 6b of the upper reinforcing element 6, such that the two outermost vertical regions 6bV and 6bV (situated furthest to the left and right, respectively, as viewed from FIG. 7) of the reinforcing portion 6b may be aligned and attached with those two first vertical portions 4c-1 and 4c-1, respectively.

Also, a distance between the two second vertical portions 4c-2 and 4c-2 of the support wire element 4 is equal to a distance between the two vertically-extending mid regions 10c-2 and 10c-2 of the lower reinforcing element 10. In other words, such two vertically-extending mid regions 10c-2 may be aligned and attached with the two second vertical portions 4c-2 and 4c-2, respectively.

It is further noted that the vertical region 4bV and lower horizontal region 4bHL of each of the two oxbow portions 4b are of such a configuration that can be aligned and attached with the vertical and horizontal regions 10bV and 10c-1 of the lower reinforcing element 10, respectively, as understandable from FIGS. 1 and 2.

Now, a description will be made of assembling the upper and lower reinforcing elements 6 and 10 with the support wire element 4.

First of all, looking at FIGS. 7, 8 and 9, it is observed that a blackened area is indicated in each of pertinent corner or bent portions associated with the upper reinforcing element 6, support wire element 4 and lower reinforcing element 10. It should however be understood that such blackened areas are intended, as an imaginary black marking, to virtually indicate particular localized connecting positions where those elements 4, 6 and 10 are to be connected together, for an explanatory purpose, and therefore all the blackened areas are non-existent therein.

Based on such understanding, at first, as seen in FIG. 7, two particular right-angled bent portions of the upper reinforcing element 6 are each imaginarily blackened to indicate a connecting position which is designated by 6d. Second, referring to FIG. 8, two uppermost right-angled bent portions of the support wire element 4 are each imaginarily blackened to indicate a connecting position designated by 4dU. Hence, when connecting the upper reinforcing element 6 to the support wire element 4, a worker, for instance, can easily memorize all the associated right-angled portions thereof corresponding to the imaginarily blackened areas in FIGS. 7 and 8, respectively, and therefore can readily recognize precise positions for connecting the upper reinforcing element 6 to the top region of the support wire element 4. Accordingly, in assembly, the two right-angled bent portions of upper reinforcing element 6 (as at 6d and 6d in FIG. 7) are aligned by the worker with the two uppermost right-angled bent portions of support wire element 4 (as at 4dU and 4dU in FIG. 8), respectively, and then the worker connects them together securely via a suitable connecting means, as shown in FIGS. 1 and 2. The connecting means, for example, includes the shown metallic securing strips P which are wound about the pertinent connecting portions of those elements 4 and 6, respectively.

Referring now to FIG. 9, it is observed that two imaginarily blackened areas are indicated at the particular rectilinear and right-angled portions of the lower reinforcing element 10, thus representing a pair of meandering blackened areas which are generally designated by 10d and 10d, respectively. Specifically, each of those two meandering blackened areas 10d and 10*d* imaginarily covers the following particular regions of the reinforcing element 10: most of the vertical region 10*c*-2, an entirety of the horizontal region 10*c*-1 and substantially a half of vertical region 10*b*V, as shown. On the other hand, referring back to FIG. 8, two imaginarily blackened areas are indicated at the lower rectilinear and right-angled portions of the support wire element 4, thus representing a pair of meandering blackened areas which are generally designated by 4*d*L and 4*d*L, respectively. Specifically, each of those two meandering blackened areas 4*d*L and 4*d*L imaginarily covers the following regions of the support element 4: most of the vertical region 4*b*V, an entirety of the horizontal region 4*b*HL and substantially a half of vertical region 4*c*-2, as shown. Hence, a worker can easily memorize all the associated portions thereof corresponding to the imaginarily blackened areas in FIGS. 8 and 9, respectively, and can readily recognize precise positions for connecting the lower reinforcing element 10 to the lower region of the support wire element 4. In assembly, therefore, the worker can take the lower reinforcing element 10 and look at two inwardly-facing upper corner portions thereof, just near to the two designations 10*d* and 10*d*, respectively. In other words, each of those two upper corner portions is defined between the horizontal and vertical regions 10*c*-1 and 10*c*-2, in the imaginarily blackened areas, as seen in the FIG. 9. Thus, he or she can regard those two upper corner portions of the lower reinforcing element 10 as connecting points for connection with the support wire element 4.

Next, the worker should look at the two lowermost corner portions of the support wire element 4, just near to the designations 4*d*L and 4*d*L, respectively, in FIG. 8. In other words, each of those two lowermost corner portions is defined between the horizontal and vertical regions 4*d*HL and 4*c*-2, in the imaginarily darkened areas, as can be seen in the FIG. 8. Here, as previously stated, the upper reinforcing element 6 has been securely connected to the top region of that support wire element 4.

Then, the worker should simply align the afore-said two upper corner portions (at 10*d*) of the lower reinforcing element 10 with the afore-said two lowermost corner portions (at 4*d*L) of the support wire element 4, respectively. In that way, all the connecting portions of the lower reinforcing element 10 are readily aligned with all the connecting portions of the support wire element 4, respectively, at one time, at the predetermined positions imaginarily blackened in FIGS. 8 and 9. Thereafter, all the thus-aligned connecting portions of the two elements 10 and 4 are securely connected together by the worker, using the metallic securing strips P, as can be understood from FIGS. 1 and 2.

In this regard, owing to the foregoing easily-recognizable and easily-connectable positions, the above-described assembling processes may be automatically effected by a fully-automated production system or robots.

Upon completion of the assembly described above, all the aforementioned elements 4, 6 and 10 are connected together in position, thereby providing one unit of wire assembly that can be seen in FIGS. 1 and 2.

Such one unit of wire assembly (4, 6 and 10) are mounted in the seat back frame 2 through the following easy and simplified steps:

a) At first, the two vertical long end portions 6*a* and 6*a* of the upper reinforcing element 6 are inserted into two holes 7Ua and 7Ua formed respectively in the two upper brackets 7U and 7U of the seat back frame 2, respectively, in an upward direction from below those brackets 7U and 7U, and passed slidingly therethrough until the two horizontal portions 6*c* and 6*c* of that reinforcing element 6 come to contact with the two bottom surfaces respective of the two upper brackets 7 and 7, respectively. As a result thereof, both two vertical end portions 6*a* and 6*a* project upwardly to a maximum extent from the upper brackets 7 and 7.

b) At this point, the two outermost vertical regions 10*b*V and 10*b*V (i.e. two free vertical end portions) of the lower reinforcing element 10 are temporarily positioned above and distant from the two lower brackets 7L and 7L of the seat back frame 2, respectively. Then, those two free vertical end portions 10*b*V and 10*b*V are respectively aligned with and inserted into two holes 7La and 7La respectively formed in the two lower brackets 7L and 7L in a downward direction.

c) During the step b) above, on the other hand, the horizontal region 10*e*-1 of the lower reinforcing element 10 is also partly inserted and engaged in a connecting lug 2*c*A of substantially L-shaped section which is formed integral with the lower frame member 2*c* of the seat back frame 2.

Of course, to permit effecting of the above-described steps, an entire vertical length of the one unit of wire assembly (4, 6 and 10) should be preset appropriately relative to a distance between the upper and lower brackets 7U and 7L as well as relative to a distance between the upper and lower frame members 2*a* and 2*c* of the seat back frame 2. Also, an overall size of that one unit of wire assembly be preset appropriately relative to a space defined inwardly of the seat back frame 2.

Accordingly, as best shown in FIG. 2, the one unit of wire assembly (4, 6 and 10) is securely mounted in the space defined inwardly of the seat back frame 2 at the three connection points at 7U, 7L and 2*c*A, in a suspended fashion. In this regard, as seen in FIG. 3, the upper reinforcing element 6 is disposed at a location substantially corresponding to a dorsal portion MU of a seat occupant M, whereas the lower reinforcing element 10 disposed at a location substantially corresponding to a lumbar portion ML of that seat occupant.

Designations 20 and 20 denote a pair of headrest holders fixed on the upper frame member 2*a* of the seat back frame 2. Looking at FIGS. 2 and 3 comparatively, it is to be understood that a pair of headrest stays 21 and 21 extending downwardly of a headrest HR are inserted and supported in those two headrest holders 20 and 20, respectively, as known in the art.

Now, a description will be made of how the upper and lower reinforcing elements 6 and 10 will function to a seat occupant M, with reference to FIGS. 3 and 4, on the understanding that the seat occupant M is seated in a vehicle seat having the seat back 1 provided with the above-described elements 4, 6 and 10, during his or her driving of an associated vehicle (not shown).

With first reference to FIG. 3, there is shown a state where a seat occupant M is seated in a vehicle seat having the seat back 1 of the present invention, with his or her back portion resting on that seat back 1, under a normal running of the vehicle. Also, the seat occupant's head portion (MH) is received on and supported by the headrest HR that has been stated above. Note that such normal running of the vehicle is based on the conditions that the vehicle runs on either relatively flat or uneven roads and stops occasionally, which generates a number of relatively week vibrations in the forward and rearward directions.

Under such state, when the vibrations occur continuedly in the vehicle, the seat occupant M is naturally swung and rocked forwardly and backwardly a number of times. In this instance, it is defined hereby that a low load is applied from the back portion of that seat occupant M to the seat back 1, intermittently and numerously, in a rearward direction to the seat back 1.

In particular, a rearward low load (at F1 in FIG. 4) applied from the seat occupant's dorsal portion MU is exerted repeatedly upon the upper end region of the support wire element 4 as well as upon the upper reinforcing element 6. As with the prior art, such repeated application of low load may cause substantive forward and rearward oscillation of those elements 4 and 6, thus resulting in undesired forward-and-rearward swinging and rocking of the seat occupant's dorsal portion MU. However, in the present invention, the upper reinforcing element 6 includes the main reinforcing portion 6b defined integral with and between the two horizontal portions 6c and 6c thereof, and further, that reinforcing portion 6b is securely connected between the two upper end regions respective of the two upper vertical portions 4c-1 and 4c-1 of the support wire element 4. This main reinforcing portion 6b, by the reason of its being formed in the shown sinuous manner, is hard to bend or warp forwardly and rearwardly of the seat back frame 2, as compared with the afore-said portions 6c and 4c-1 which are easy to bend and oscillate by repeated application of the rearward low load thereto. Such provision of the main reinforcing portion 6b therefore offers a reinforced area sufficient to withstand the rearward low load caused at the bendable portions 4c-1 and 6c situated at the upper portion of the support wire element 4. Thus, even when the rearward low load from the seat occupant's dorsal portion MU is applied repeatedly to the corresponding upper area of the seat back 1, the main reinforcing portion 6b is still not warped and remains immovable in any of forward and rearward directions, thereby preventing forward-and-rearward oscillation of its associated horizontal portions 6c as well as of the support wire element's upper portions 4c-1. Consequently, most of the rearward low load applied from the seat occupant's dorsal portion MU is blocked by the upper reinforcing element 6 and absorbed in the a forward local padding portion of the padding PD provided in the seat back 1. Note that such forward local padding portion is situated adjacent to the frontal surface of the seat back 1, as understandable in FIG. 3. This arrangement effectively prevents forward-and-rearward swinging or rocking of the seat occupant's dorsal portion MU in the seat. The seat occupant M can therefore be seated comfortably and stably in the seat.

In this context, in some cases, the main reinforcing portion 6b may be resiliently warped slightly, which is however so slight as to minimize forward-and-rearward oscillation of that particular reinforcing portion 6b and also minimize concurrent forward-and-rearward oscillation of the associated portions 6c and the adjacent support wire element's portions 4c-1. Hence, in that case, a resultant forward-and-rearward swinging or rocking of the seat occupant's dorsal portion MU is very little, to such an extremely low degree that the seat occupant will not feel any prominent objectionable swinging of his or her dorsal portion in the forward and rearward directions.

The above-discussed meritorious effects of the upper reinforcing element 6 also hold true for the lower reinforcing element 10 which includes a pair of the left and right reinforcing portions 10b and 10b, each substantially corresponding in shape to the main reinforcing portion 6c of the upper element 6. Those two reinforcing portions 10b and 10b, formed in the shown sinuous manner respectively, are hard to bend or warp forwardly and rearwardly of the seat back frame 2, as compared with the lower regions and two lower portions 4c-2 and 4c-2 of the support wire element 4 which are easy to bend and oscillate by repeated application of the rearward low load thereto. This provision of two reinforcing portions 10b and 10b therefore offers a reinforced area sufficient to withstand the rearward low load at the bendable portions 4c-2 situated at the lower portion of the support wire element 4. Thus, when vibrations occur continuedly in the vehicle as explained earlier, a rearward low load is applied from the seat occupant's lumbar portion ML to the corresponding lower region of seat back 1, numerous times. Such rearward low load caused at the lumbar portion ML is greater than the rearward low load at the dorsal portion MU, due to the fact that, every time the rearward low load is caused at the seat occupant's lumbar portion ML, both buttocks portion (not designated) and lumbar portion ML of the seat occupant M, greater in mass and weight than the dorsal portion MU thereof, are first displaced rearwardly, under the inertia thereof, relative to the dorsal portion MU which is still at this moment, thus producing a relatively great amount of rearward low load as compared with an amount of subsequently-produced rearward low load at the dorsal portion MU. In the present invention, the pair of reinforcing portions 10b and 10b are of a robust configuration sufficient to withstand such relatively great amount of low load caused at the lumbar portion ML. Therefore, even when the rearward low load from that lumbar portion ML is applied repeatedly to the corresponding lower area of the seat back 1, both two reinforcing portions 10b and 10b are not warped and remains immovable in any of forward and rearward directions, thereby preventing forward-and-rearward oscillation of the associated vertical portions 10bV thereof and the support wire element's lower portions 4c-2. Consequently, most of the rearward low load applied from the lumbar portion ML is blocked by the lower reinforcing element 10 and absorbed in the forward local padding portion of the foam padding PD, so that the seat occupant's lumbar portion ML is prevented from being swung and rocked in the forward and rearward directions. With such arrangement, the seat occupant M can be comfortably and stably seated in the seat.

Of course, in some cases, the two reinforcing portions 10b and 10b may be resiliently warped slightly, which is however so slight as to minimize forward-and-rearward oscillation of those particular reinforcing portions 10b and also minimize concurrent forward-and-rearward oscillation of the adjacent support wire element's portions 4c-2. Hence, a resultant forward-and-rearward swinging or rocking of the seat occupant's lumbar portion ML is very little, to such an extremely low degree that does not make the seat occupant feel any prominent objectionable swinging or rocking of his or her lumbar portion in the forward and rearward directions.

Figure 4:
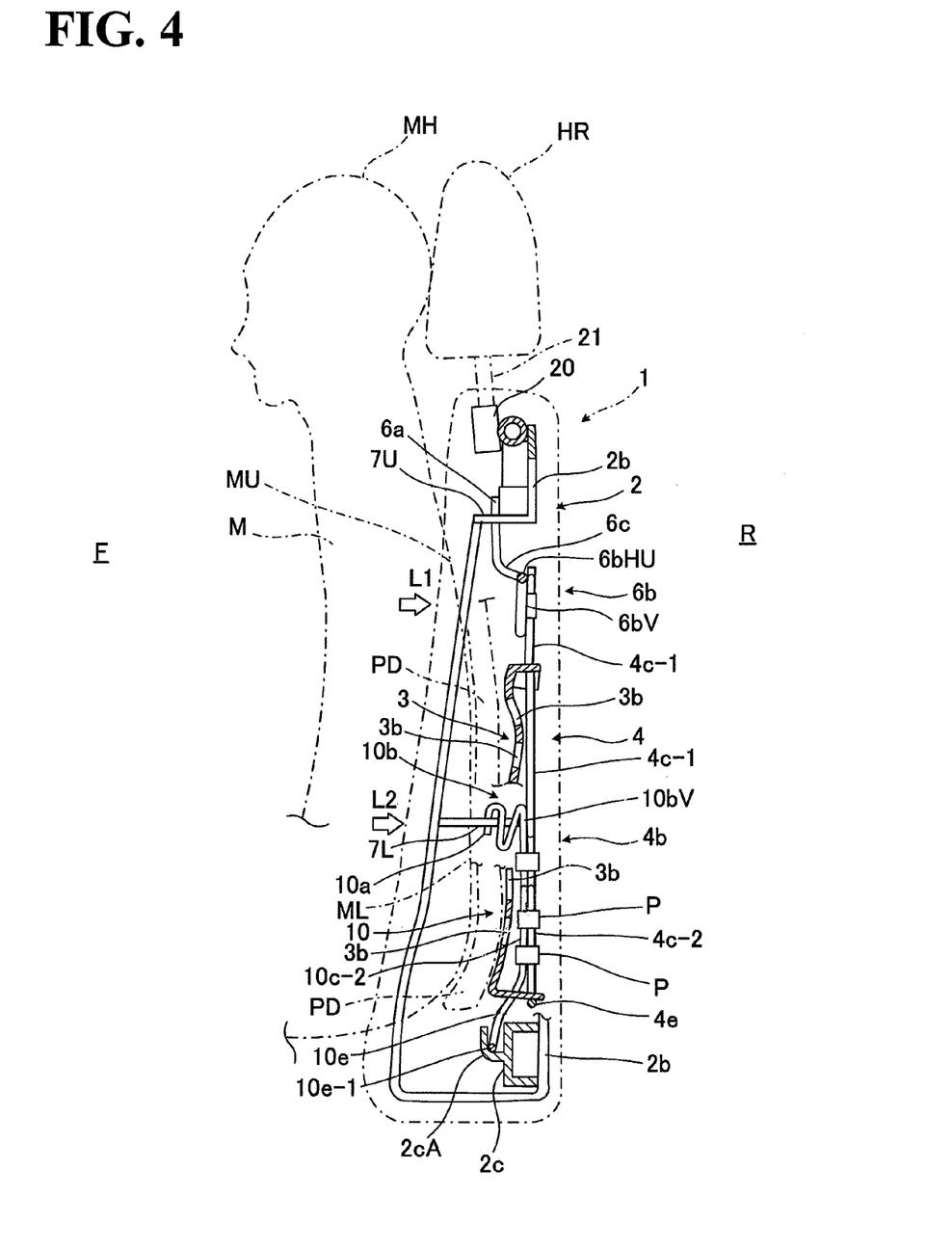
FIG. 4 is a schematic sectional view which explanatorily illustrates a state where an excessive great load is applied to the seat back in the event of a rear-end collision or the like and all the reinforcing elements are displaced rearwardly to absorb a corresponding great impact for protection of the seat occupant.

Reference is now made to FIG. 4 which indicates a state where the upper body portion of the seat occupant M is abruptly moved rearwardly to the seat back 1, under his or her inertia, in the event of a rear-end collision or a forwardly-applied excessive great load exerted on the vehicle. In that instance, in contrast to the previously-described low load conditions, an excessive great load is applied from the seat occupant's back portion rearwardly to the seat back 1

Figure 5:
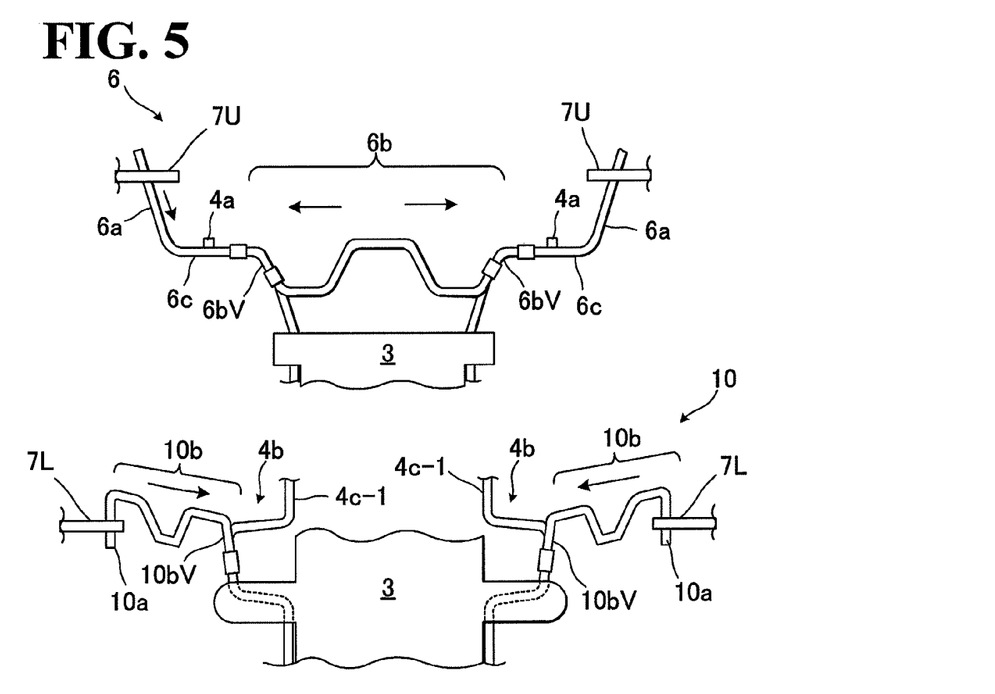
FIG. 5 is a schematic diagram showing a state where both upper and lower resilient reinforcing elements are resiliently extended in the longitudinal direction thereof, while being resiliently warped in a rearward direction of the seat back.

More specifically, upon occurrence of a rear-end collision for example, both buttocks portion and lumbar portion ML of the seat occupant M, greater in mass and weight than the dorsal portion MU thereof, are first displaced rearwardly, under the inertia thereof, relative to the dorsal portion MU, as discussed above. As a result thereof, an excessive great load F2 is first caused at the lumbar portion ML and applied rearwardly to the corresponding lower area of the seat back 1. This rearward excessive great load F2 is imparted via the padding PD and support plate 3 to the lower region of the support wire element 4 as well as to the lower reinforcing element 10. At that moment, the two reinforcing portions 10*b* and 10*b* are each resiliently extended long in the longitudinal direction thereof, while being resiliently warped in the rearward direction of the seat back frame 2, as best shown in FIGS. 4 and 5, such that all the vertical regions 10*b*V thereof are resiliently inclined outwardly with respect to the adjoining horizontal regions 10*b*HL and 10*b*HU, respectively. Concurrent therewith, the lower end portion 10*e* of the lower reinforcing element 10 is also resiliently warped rearwardly of the seat back frame 2, as can be seen from FIGS. 4 and 5. But, during such resilient deformation of lower reinforcing element 10, the lower areas of the support wire element 4, i.e. the lower portions 4*c*-2 and end portion 4*e* thereof as well as the upper portions 4*c*-1 portion thereof in part, are not warped in any direction and thus displaced rearwardly, maintaining their original vertical shapes perpendicular to a horizontal line along which there lies a seat cushion (not shown) connected with the seat back 1. In other words, both two reinforcing portions 10*b* and one lower end portion 10*e* are only warped rearwardly, whereas by contrast, the lower area of the support wire element 4 (at 4*b* and 4*c*-2, including 4*c*-1 in part), corresponding to the lumbar portion ML, remains in its original vertical or perpendicular state with respect to the seat cushion and is therefore not warped rearwardly. This is because substantially an entirety of the two oxbow portions 4*b* and 4*b* and two lower vertical portions 4*c*-2 and 4*c*-2 of the support wire element 4 is securely connected with and along: the two innermost vertical regions 10*b*V and 10*b*V which are situated most inwardly of the lower reinforcing element 10 among the four vertical regions 10*b*V; the two horizontal portions 10*c*-1 and 10*c*-1; and the two vertical portions 10*c*-2 and 10*c*-2, which are all associated with the lower reinforcing element 10, thus providing a strong reinforcement to the lower area of support wire element 4 corresponding to the seat occupant's lumbar portion ML, which is sufficient to withstand the excessive great load L2 and thereby prevents rearward bending or warping of the afore-said particular area (at 4*b* and 4*c*-2, including 4*c*-1 in part) of the support wire element 4.

With the above-described arrangements, a great impact energy of the load F2 is effectively absorbed by the rearward resilient warping of the two reinforcing portions 10*b* and lower end portions 10*e* to protect the seat occupant's lumbar portion ML against damage and injury.

On the other hand, immediately followed by the foregoing rearward excessive load F2, another rearward excessive load F1 is caused at the seat occupant's dorsal portion MU, as seen in FIG. 4, due to the fact that the seat occupant's dorsal portion MU is not displaced rearwardly until commencement of the rearward displacement of seat occupant's lumbar portion ML, as discussed earlier, in the case of rear-end collision or the like.

Figure 6:
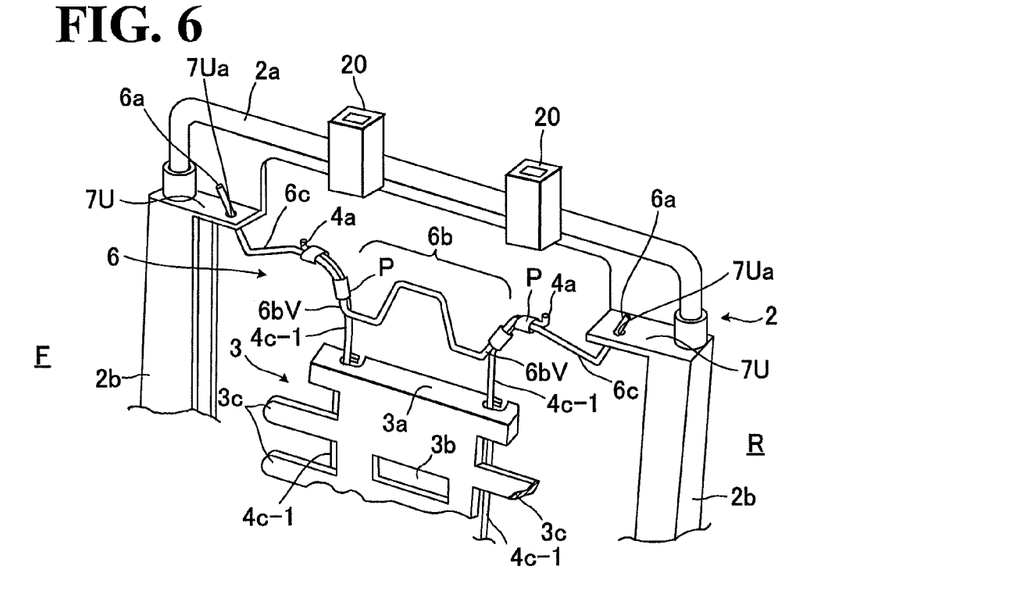
FIG. 6 is a partly broken perspective view which particularly shows the upper resilient reinforcing element as being resiliently deformed in a three-dimensional way.

This rearward excessive load F1 is applied from the dorsal portion MU to the seat back 1 and imparted via the padding PD and support plate 3 to the upper region of the support wire element 4 as well as the upper reinforcing element 6. At this moment, both two upper vertical regions 4*c*-1 and 4*c*-1 of the support wire element 4, including both two upper end portions 4*a* an 4*a* thereof, are displaced rearwardly of the seat back frame 2, which simultaneously causes both two horizontal regions 6*c* and 6*c* of the upper reinforcing element 6 to resiliently twist or rotate rearwardly relative to the two vertical end portions 6*a* and 6*a*, respectively, as can be seen in FIGS. 4 to 6. Concurrent therewith, the two vertical end portions 6*a* and 6*a* are instantly slidingly moved downwards in the two holes 7Ua and 7Ua, respectively, which can also be seen in the FIG. 4 to and 6. Further, concurrently, the main reinforcing portion 6*b* of upper reinforcing element 6 is resiliently extended long in the longitudinal direction thereof, such that all the vertical regions 6*b*V thereof are resiliently pulled and inclined outwards with respect to the adjoining horizontal regions 6*b*HL and 6*b*HU, respectively, which is best seen in FIGS. 5 and 6. Accordingly, it is to be seen that the immediately downward sliding of the two vertical end portions 6*a*, the rearward resilient twisting or rotation of the two horizontal regions 6*c*, and the rearward resilient warping of the main reinforcing portion 6*b* effectively absorb a great impact energy of the rearward excessive load F1, thereby protecting the seat occupant's dorsal portion MU against damage and injury.

Here, it is to be appreciated that, during the rear-end collision, a whole of the support wire element 4 is not warped in any direction, while it is being displaced rearwardly with the upper and lower reinforcing elements 6 and 10, but remains substantially perpendicular to a horizontal plane or the seat cushion connected with the seat back 1, as discussed earlier. This can be understood by taking a comparative look at FIGS. 3 and 4. In accordance with the present invention, a coefficient of elasticity of the upper reinforcing elements 6 and a coefficient of elasticity of the lower reinforcing element 10 are adjusted and preset appropriately with respect to the corresponding two excessive great loads F1 and F2, in order that a whole of the support wire element 4 may be maintained in its original vertical state perpendicular to a horizontal plane or the seat cushion, in the case where a rear-end collision occurs or a forwardly-applying external excessive load is applied to the vehicle. By the virtue thereof, when such forwardly-applying external excessive load is applied to the seat, an entirety of the seat occupant's back portion, supported by the support wire element 4, is not inclined in any of forward and rearward directions, but displaced rearwardly under the original vertically-extending posture thereof into the frontal surface of the seat back 1, except that all the reinforcing portions 6*b* and 10*b* of the upper and lower reinforcing elements 6 and 10, inclusive of the lower end portion 10*e* of the lower reinforcing element 10, are resiliently warped rearwardly. This means that all the upper body portions of the seat occupant M including the head MH thereof, are not inclined forwardly relative to his or her buttocks portion, but remains in the substantially vertical original state or posture thereof. Consequently, the seat occupant's head MH is prevented against its forward movement away from the headrest HR and thus kept in contact therewith, as understandable from FIGS. 3 and 4, so that the head MH may not be struck hardly against the headrest HR and not rebounded greatly therefrom, either, hence preventing or minimizing damage or injury (e.g. a whiplash) to the head and neck portions of the seat occupant M.

In any case, a coefficient of elasticity of the upper reinforcing element 6 and a coefficient of elasticity of the lower reinforcing element 10 are preset appropriately to achieve all the above-described actions and effects.

From the foregoing descriptions, in accordance with the present invention, it is to be appreciated that:

(i) The main reinforcing portion 6*b* of the upper reinforcing element 6 includes a plurality of vertical and horizontal regions (at 6*b*V, 6*b*HL and 6*b*HU) which provide a robust structure, wherein those vertical and horizontal regions are connected with the upper area of the support wire element 4, as shown. Therefore, the upper area of support wire element 4, substantially corresponding to the seat occupant's dorsal portion MU, is normally reinforced by those vertical and horizontal regions (at 6*b*V, 6*b*HL and 6*b*HU) so as to prevent or minimize forwardand-rearward swinging and rocking of the seat occupant's dorsal portion, during normal driving of a vehicle wherein a low load is repeatedly applied from that dorsal portion MU to the seat back.

(ii) Also, the two reinforcing portions 10b and 10b each includes a plurality of vertical and horizontal regions (at 10bV, 10bHL and 10bHU) as well as the end portion 10e, which also provide a robust structure, wherein those vertical and horizontal regions are connected with the lower area of the support wire element 4, as shown. Therefore, the lower area of support wire element 4, substantially corresponding to the seat occupant's lumbar proton ML, is reinforced by those regions (at 10bV, 10bHL, 10bHU 10e) so as to prevent or minimize forward-and-rearward swinging and rocking of the seat occupant's lumbar portion, during normal driving of a vehicle wherein a low load is repeatedly applied from that lumbar portion ML to the seat back.

(iii) Thanks to the effects stated in the (i) and (ii) above, the seat occupant does not feel any uncomfortable swinging or rocking at his or her back portion during the normal driving of vehicle, in contrast to the prior art stated earlier.

(iv) When an excessive great load (F1 and F2) is suddenly applied to the seat back 1 in the event of a rear-end collision or the like, all the afore-said reinforcing portions 6b and 10b, formed by the vertical and horizontal regions (at 6bV, 6bHL, 6bHU, 10bV, 10bHL and 10bHU) as well as the lower end portion 10e, are resiliently warped in the rearward direction, while being resiliently extended long in the longitudinal direction thereof, thereby absorbing a corresponding great impact given to the seat occupant and therefore protecting the seat occupant's dorsal and lumber portions against damage and injury.

While having described the present invention thus far, it should be understood that the invention is not limited to the illustrated embodiment, but any modification, replacement and addition May be applied thereto, without departing from the scope of the appended claims.

What is claimed is:

1. A seat back of a vehicle seat, which has a frontal surface facing to a forward side of the seat back, said frontal surface being adapted to receive a back portion of a seat occupant to be seated in the vehicle seat, comprising:
   a foam padding provided in said seat back, said foam padding including a padding portion disposed adjacent to said frontal surface of the seat back;
   a seat back frame so formed to have a space defined inwardly thereof, said seat back frame including: a first bracket having a hole formed therein; and a second bracket having a hole formed therein, wherein said first and second brackets are disposed in a spaced-apart and opposedly-facing relationship;
   a support wire element having a rigidity, said support wire element being disposed within said space of said seat back frame in a suspended manner;
   a support plate disposed anteriorly of said support wire element within said space of said seat back frame, said support plate being attached to said support wire element and adapted to support said padding portion of said foam padding;
   said support wire element including an upper portion which projects from said support wire element in a direction upwardly of the seat back frame; and
   a resilient reinforcing element formed of a rigid wire having an elastic property, said resilient reinforcing element being provided to said upper portion of said support wire element and being so configured as to include:
   a) a pair of upper end portions slidably inserted in said hole of said first bracket and said hole of said second bracket, respectively; and
   b) a main reinforcing portion which is resiliently extensible, while being resiliently deformable in a rearward direction of said seat back frame,
   wherein said resilient reinforcing element is of such a property that, under a normal condition where a low load is applied via said padding portion and support plate towards said upper portion of said support wire element in a rearward direction of the seat back, said resilient reinforcing element withstands said low load and maintains the shape thereof, thereby preventing said upper portion of said support wire element against movement in forward and rearward directions of the seat back, upon an excessive great load being applied to said upper portion of said support wire element in the rearward direction of the seat back, said resilient reinforcing element is resiliently deformed in the rearward direction, such that said main reinforcing portion thereof is resiliently extended, while being resiliently deformed in the rearward direction of the seat back frame, whereas at the same time, said pair of upper end portions thereof are slidingly moved in said hole of said first bracket and said hole of said second bracket, respectively, in a downward direction of the seat back frame, thereby absorbing said excessive great load.

2. The seat back of a vehicle seat as claimed in claim 1, wherein said main reinforcing portion includes a plurality of vertical and horizontal regions defined therein, said plurality of vertical and horizontal regions being connected with said support wire element, so that said upper portion of said support wire element is reinforced thereby to withstand said low load under said normal condition.

3. The seat back of a vehicle seat according to claim 2, wherein said main reinforcing portion is formed in a sinuous fashion including said plurality of vertical and horizontal regions defined therein, and wherein said main reinforcing portion extends in a direction transversely of said seat back frame.

4. The seat back of a vehicle seat as claimed in claim 1, wherein said resilient reinforcing element is formed by bending one rigid wire having an elasticity in such a configuration that said main reinforcing portion thereof includes a plurality of vertical and horizontal regions defined therein and extends in a sinuous fashion in a direction transversely of said seat back frame.

5. The seat back of a vehicle seat as claimed in claim 1, wherein said resilient reinforcing element is situated at a location adapted to correspond to a dorsal portion of said seat occupant.

6. The seat back of a vehicle as claimed in claim 1, wherein said support wire element includes:
   a first vertical portion having an upper portion corresponding to said upper portion of the support wire element;
   a second vertical portion having an upper portion corresponding to said upper portion of the support wire element;
   a lower portion defined below said upper portions respectively of said first and second vertical portions, said lower portion including:
   a first connecting portion defined in said first vertical portion at a point below said upper portion of the first vertical portion; and a second connecting portion defined in said second vertical portion at a point below said upper portion of the second vertical portion;

wherein said first and second connecting portions are situated below said first and second brackets, respectively, wherein the seat back further includes another resilient reinforcing element formed of a rigid wire having an elastic property, said another resilient reinforcing element being provided to said lower portion of said support wire element and being configured to include: a body portion; and a pair of reinforcing portions extending outwardly from said body portion in a direction opposite to each other, wherein said pair of reinforcing portions are securely connected with said first and second connecting portions of said support wire element, respectively, wherein said another resilient reinforcing element is resiliently extensible, while being resiliently deformable in the rearward direction of said seat back frame, and wherein said another resilient reinforcing element is of such a property that, under a normal condition where a low load is applied via said padding portion and support plate towards said lower portion of said support wire element in the rearward direction of the seat back, said another resilient reinforcing element withstands said low load and maintains the shape thereof, thereby preventing said lower portion of said support wire element against movement in forward and rearward directions of the seat back frame, upon an excessive great load being applied to said lower portion of said support wire element in the rearward direction of the seat back, said another resilient reinforcing element is resiliently deformed in the rearward direction, such that said pair of reinforcing portions thereof are each resiliently extended, while being resiliently deformed in the rearward direction of the seat back frame, thereby absorbing said excessive great load.

7. The seat back of a vehicle seat as claimed in claim 6, wherein said pair of reinforcing portions each includes a plurality of vertical and horizontal regions defined therein, and wherein said plurality of vertical and horizontal regions respectively of said pair of reinforcing portions are connected with said first and second connecting portions of said support wire element, respectively, so that said lower portion of the support wire element is reinforced thereby to withstand said low load under said normal condition.

8. The seat back of a vehicle seat according to claim 7, wherein said pair of reinforcing portions are each formed in a sinuous fashion including said plurality of vertical and horizontal regions defined therein, and wherein said pair of reinforcing portions extend in a direction transversely of said seat back frame.

9. The seat back of a vehicle seat as claimed in claim 6, wherein said another resilient reinforcing element is formed by bending one rigid wire having an elasticity in such a configuration that said pair of reinforcing portions thereof each includes a plurality of vertical and horizontal regions defined therein and extends in a sinuous fashion in a direction transversely of said seat back frame.

10. The seat back of a vehicle seat as claimed in claim 6, wherein said another resilient reinforcing element is situated at a location adapted to correspond to a lumbar portion of said seat occupant.

11. The seat back of a vehicle seat as claimed in claim 6, wherein said seat back frame further includes: a third bracket disposed below said first bracket, said third bracket having a hole formed therein; and a fourth bracket disposed below said second bracket, said fourth bracket having a hole formed therein, wherein said pair of reinforcing portions each includes a plurality of vertical and horizontal regions defined therein and further includes an outermost end portion defined outwardly of said plurality of vertical and horizontal regions, and wherein said outermost end portions respective of said pair of reinforcing portions are inserted and engaged in said hole of said third bracket and said hole of said fourth bracket, respectively.

12. The seat back of a vehicle seat as claimed in claim 6, wherein said support wire element is formed in bending one rigid wire in a substantially "U" shape including said first and second vertical portions defined therein, such that said first vertical portion has an upper end portion corresponding to said upper portion of the support wire element, whereas said second vertical portion has an upper end portion corresponding to said upper portion of the support wire element, wherein said support wire element further includes: a first outwardly-curved connecting portion corresponding to said first connecting portion; and a second outwardly-curved connecting portion corresponding to said second connecting portion, in such a manner that said first and second outwardly-curved connecting portions protrude outwardly of said first and second vertical portions, respectively, in a direction opposite to each other, wherein said body portion of said another reinforcing element is securely connected with said first and second outwardly-curved connecting portions of said support wire element, such that said pair of reinforcing portions of said another reinforcing element project outwardly of said support wire element in a direction opposite to each other, and wherein said pair of reinforcing portions are connected with said seat back frame at a location below said first and second brackets.

13. The seat back of a vehicle seat according to claim 12, wherein said seat back frame further includes: a third bracket disposed below said first bracket, said third bracket having a hole formed therein; and a fourth bracket disposed below said second bracket, said fourth bracket having a hole formed therein, wherein said pair of reinforcing portions each includes a plurality of vertical and horizontal regions defined therein and further includes an outermost end portion defined outwardly of said plurality of vertical and horizontal regions, and wherein said outermost end portions respective of said pair of reinforcing element are respectively inserted and engaged in said hole of said third bracket and said hole of said fourth bracket.

14. The seat back of a vehicle seat as claimed in claim 1, wherein said support wire element is formed by bending one rigid wire in a substantially "U" shape including a first vertical portion and a second vertical portion, such that said first vertical portion has an upper end portion corresponding to said upper portion of the support wire element, whereas said second vertical portion has an upper end portion corresponding to said upper portion of the support wire element, and wherein said pair of upper end portions of said resilient reinforcing element are partly connected with said upper end portion of said first vertical portion and said upper end portion of said second vertical portion, respectively, in such a manner that said main reinforcing portion is extended between said first and second vertical portions.

15. The seat back of a vehicle seat as claimed in claim 1, wherein said support wire element includes a first vertical portion and a second vertical portion, such that said first vertical portion has an upper end portion corresponding to said upper portion of the support wire element, whereas said second vertical portion has an upper end portion corresponding to said upper portion of the support wire element, wherein said pair of upper portions of said resilient reinforcing element each includes: a horizontal region; and a vertical region extending vertically from said horizontal region, in such a manner that a pair of said horizontal regions extend outwardly of said resilient reinforcing element in a direction opposite to each other, whereas a pair of said vertical regions extend upwardly from said pair of horizontal regions, respectively, wherein said main reinforcing portion of said resilient reinforcing element is defined integrally between said pair of horizontal regions and is securely connected between said upper end portions respectively of said first and second vertical portions associated with said support wire element, and wherein said pair of vertical regions of said resilient reinforcing element are slidably inserted in said hole of said first bracket and said hole of said second bracket, respectively.

* * * * *